No. 754,335. PATENTED MAR. 8, 1904.
W. L. McCABE.
PORTABLE CONVEYER.
APPLICATION FILED APR. 2, 1902.
NO MODEL. 9 SHEETS—SHEET 1.

No. 754,335. PATENTED MAR. 8, 1904.
W. L. McCABE.
PORTABLE CONVEYER.
APPLICATION FILED APR. 2, 1902.
NO MODEL. 9 SHEETS—SHEET 2.

No. 754,335. PATENTED MAR. 8, 1904.
W. L. McCABE.
PORTABLE CONVEYER.
APPLICATION FILED APR. 2, 1902.
NO MODEL. 9 SHEETS—SHEET 3.

Witnesses
L. G. Handy
Edgar M. Ritchin

Inventor
William L. McCabe
By Mason Fenwick Lawrence
Attorneys

No. 754,335. PATENTED MAR. 8, 1904.
W. L. McCABE.
PORTABLE CONVEYER.
APPLICATION FILED APR. 2, 1902.
NO MODEL. 9 SHEETS—SHEET 6.

No. 754,335. PATENTED MAR. 8, 1904.
W. L. McCABE.
PORTABLE CONVEYER.
APPLICATION FILED APR. 2, 1902.
NO MODEL. 9 SHEETS—SHEET 7.

Witnesses
Inventor
William L. McCabe
By
Attorneys

No. 754,335. Patented March 8, 1904.

UNITED STATES PATENT OFFICE.

WILLIAM L. McCABE, OF SEATTLE, WASHINGTON.

PORTABLE CONVEYER.

SPECIFICATION forming part of Letters Patent No. 754,335, dated March 8, 1904.

Application filed April 2, 1902. Serial No. 101,102. (No model.)

*To all whom it may concern:*

Be it known that I, WILLIAM L. McCABE, a citizen of the United States, residing at Seattle, in the county of King and State of Washington, have invented certain new and useful Improvements in Portable Conveyers; and I do hereby declare the following to be a full, clear, and exact description of the invention, such as will enable others skilled in the art to which it appertains to make and use the same.

This invention relates to improvements in portable conveyers, and more particularly to means for longitudinally cupping the conveyer-belt for preventing lateral displacement of the articles conveyed.

The object in view is the supporting of the conveyer-belt in a longitudinally-cupped condition while the same is being driven; and in order to attain this object the invention consists, in combination with a suitable frame, of centrally-arranged supporting-pulleys thereon, pivotally-supported pulleys extending outside said central pulleys, means being provided for adjustment of said pulleys to varying angles relative to each other.

It also consists of certain other novel constructions, combinations, and arrangements of parts, as will be hereinafter fully described and claimed.

In the accompanying drawings.

Referring to Figs. 1, 2, 3, 4, 8, and 9 of the drawings, which illustrate one embodiment of my invention, 1 1 indicate longitudinally-arranged beams, preferably angle-irons, having suitable connecting-bars, as 2, the whole forming part of a main frame of the present conveyer. Extending parallel with each other and with beams 1 are beams, as 3 3, which, together with transverse connecting-bars or angle-irons 4, arranged at suitable intervals along the same, form an auxiliary frame, said auxiliary frame being mounted at each end or at any other suitable points upon blocks, as 5 5, having beveled under faces 6 6, each provided with a tongue, as 7, slidably engaging a groove, as 8, of its respective supporting-block, as 9, each of said supporting-blocks having correspondingly-beveled upper faces, in which the grooves 8 are formed. Each of blocks 9 is slidably mounted upon a suitable plate, as 10, extending transversely of the main frame and preferably secured thereto in any suitable manner. A bolt, as 11, is threaded into both of blocks 9, the thread of one end of said bolt being oppositely disposed relative to that of the other, whereby rotation of the bolt will cause blocks 9 either to approach each other or to separate, whereby, owing to its beveled-faced contact with blocks 5, the auxiliary frame may be moved vertically.

At suitable intervals in the length of beams 3 are secured flanged collars, as 12 12, which are formed, preferably, with somewhat oval-shaped apertures, in which are secured cuffs, as 13 13, of the same shape in cross-section. The cuffs 13 are arranged in pairs on the auxiliary frame, and each pair is connected by a shaft, as 14, each of said shafts carrying a central belt-supporting pulley, as 15. Extending into the open end of each cuff 13 is a shaft, as 16, bent at its inner end, as at 17, and pivotally attached at its outer end, as at 17', to a bracket, as 18, each bracket 18 being secured by clamps, as 19 19, or in any preferred manner to the beams 1. Each shaft 16 preferably carries a belt-supporting pulley, as 20.

Figures 1, 2:
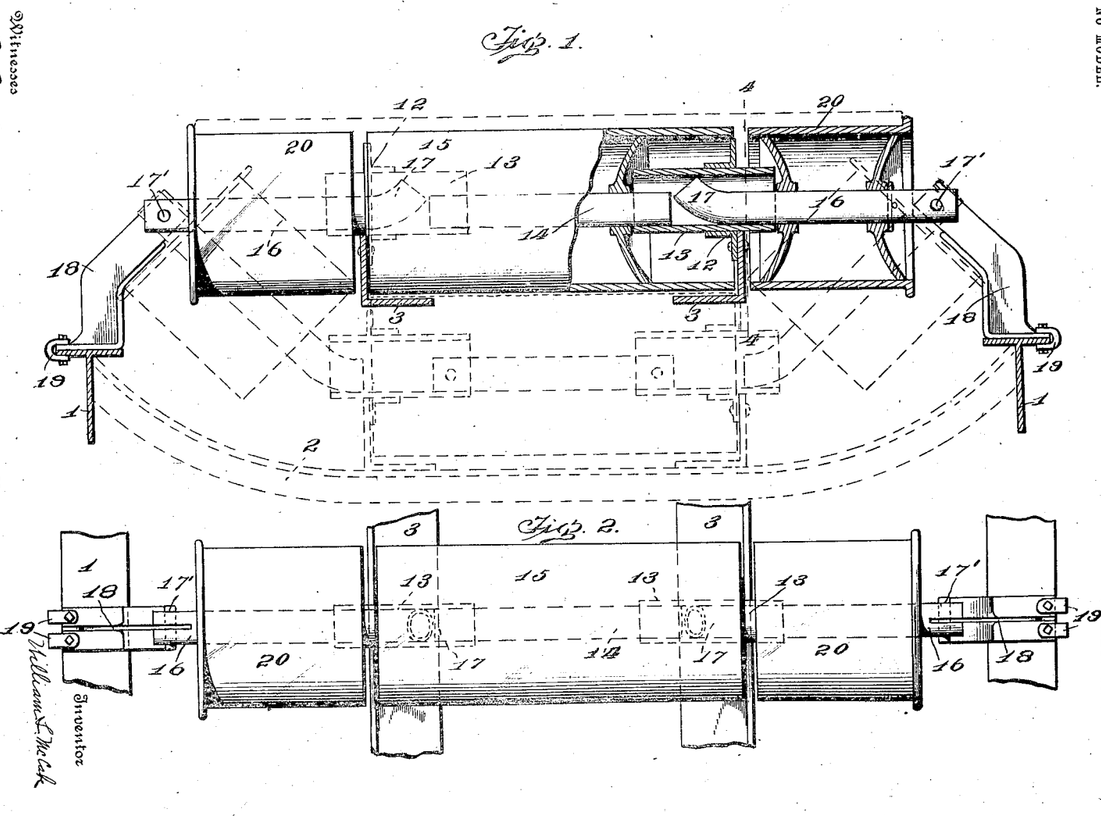
Figure 1 represents a transverse vertical section taken through one set of pulleys and the frame of a portable conveyer embodying the features of one form of the present invention.
Fig. 2 represents a top plan view of a portion of the conveyer including one set of pulleys.

It will now be clear that when the auxiliary frame is at its highest vertical position all of the belt-supporting pulleys will be in horizontal alinement; but when the blocks 9 are drawn toward each other the pulley will move downwardly with the auxiliary frame, the shafts 16 swinging on their pivots 17', they being permitted to move longitudially at their bent ends by reason of their loose engagement with cuffs 13. As the pulley 15 moves downwardly the pulleys 20 are caused to assume increasing angles relative thereto and are supported in downwardly-converging diagonal planes, whereby the carrying-belt will be lower at its center than at its edges, thereby having a longitudinal cupped condition designed to prevent lateral displacement of the articles conveyed.

It will be obvious that in addition to the function or the bolt 11 of positioning the pulleys 20 in diagonal planes it also retains or locks said pulleys in such position until it is further operated.

Figures 3, 4, 5:
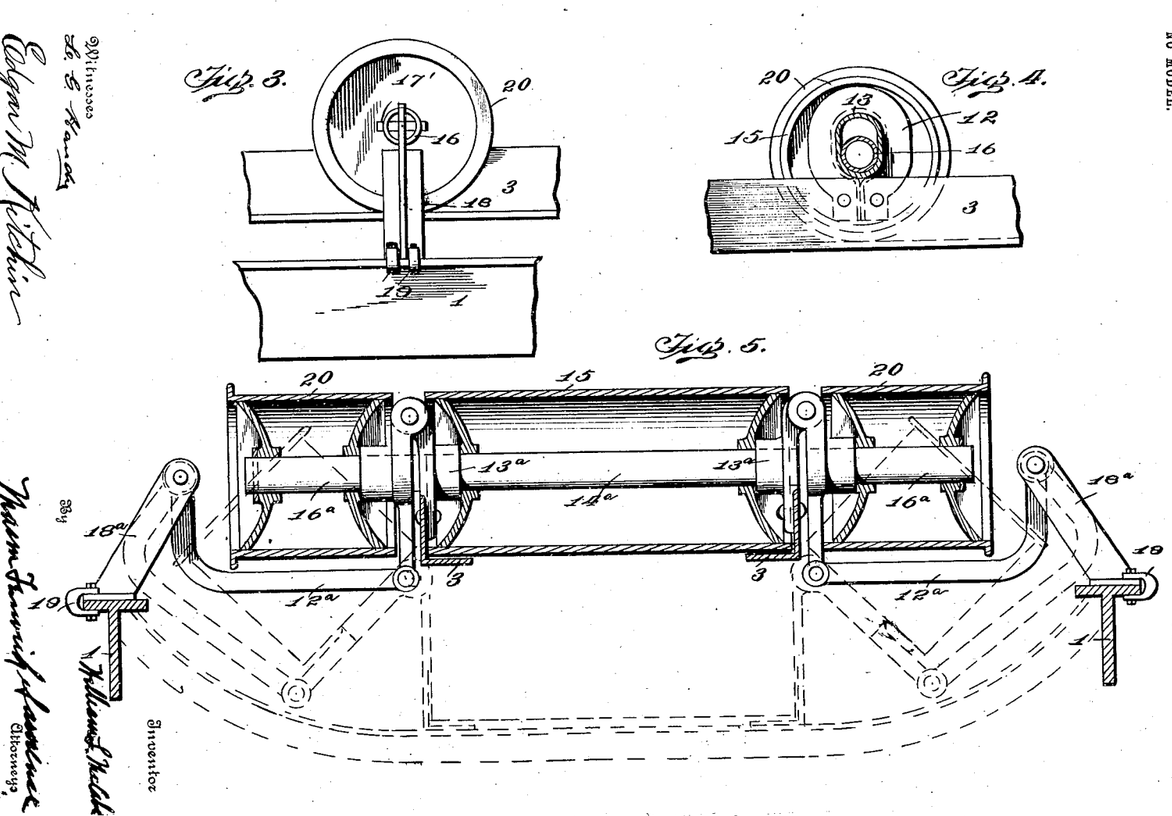
Fig. 3 represents a view in end elevation of the same.
Fig. 4 represents a detail section taken on the plane of line 4 4 of Fig. 1.
Fig. 5 represents a view similar to Fig. 1 of a slightly-modified construction.
Figures 6, 7, 12:
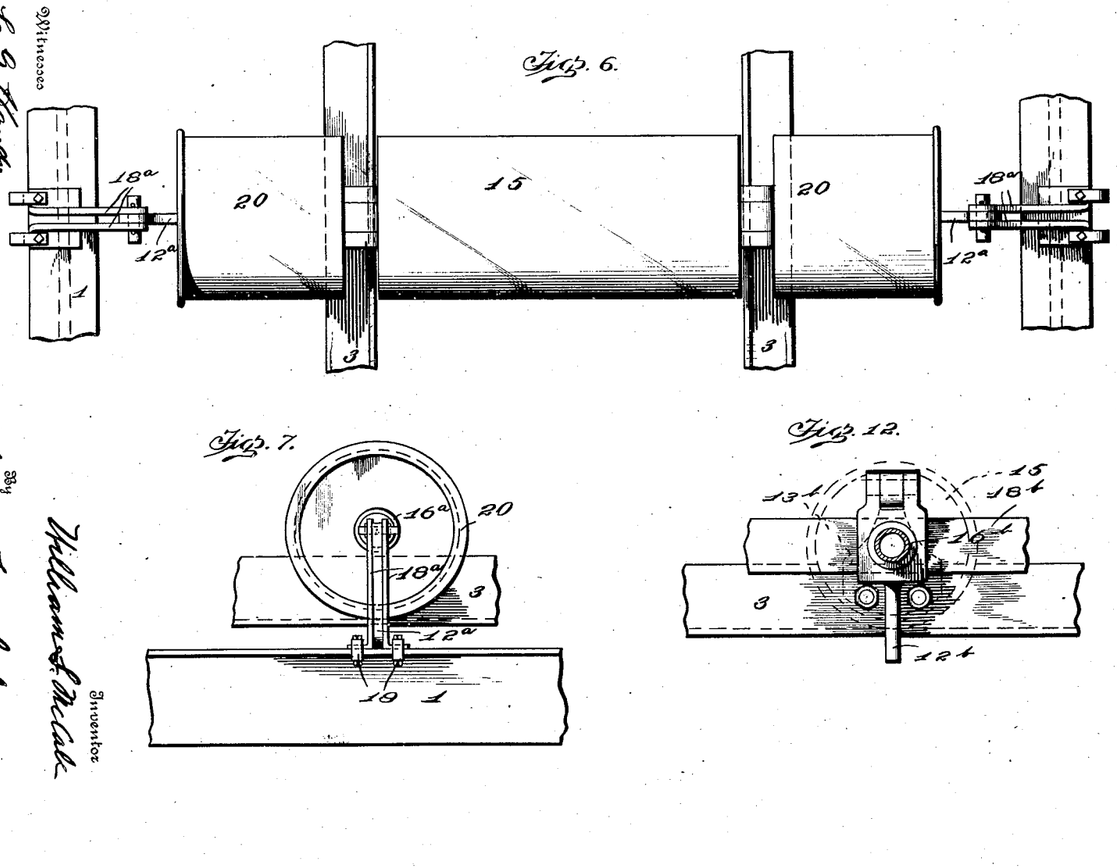
Figs. 6 and 7 represent views similar to Figs. 2 and 3, respectively, of the structure shown in Fig. 5.
Figs. 10, 11, and 12 represent similar views to Figs. 1, 2, and 3, respectively, of a modified structure.
Figure 8:
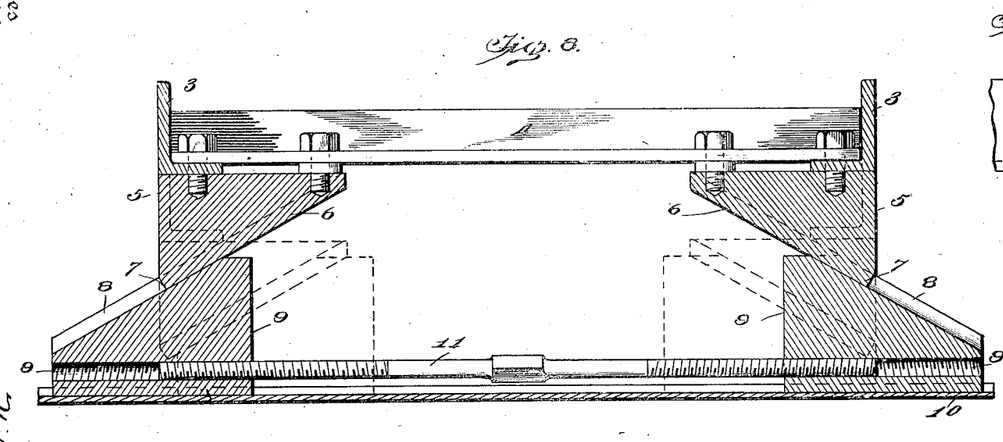
Fig. 8 represents a section through one of the auxiliary frame-adjusting mechanisms.
Figure 9:
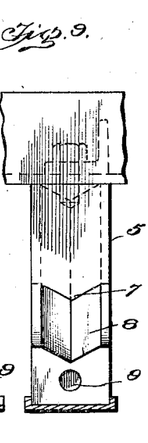
Fig. 9 represents an end elevation of the same.

The operation of the device shown in Figs. 5, 6, and 7 is precisely the same as that above described; but the structure differs in that the cuffs 13 are omitted and shaft $14^a$ is supported in brackets $13^a$, secured to the longitudinal beams 3 of the auxiliary frame. Laterally-projecting pulley-carrying shafts, as $16^a$, are hingedly connected to brackets $13^a$ and are pivotally supported by arms, as $12^a$, which arms are in turn pivoted to brackets $18^a$, secured to the main frame 1 of the device. The triple pivotal support of shafts $16^a$ effect an adjustment precisely similar to that above described when the auxiliary frame is moved vertically.

Figure 10:
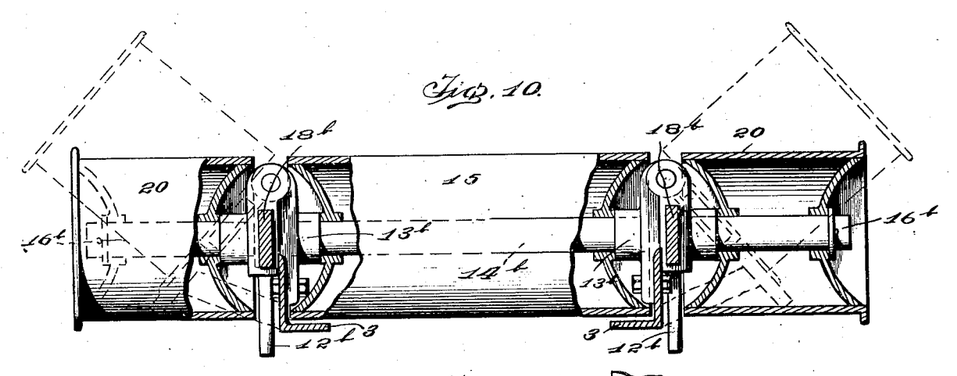
Figure 11:
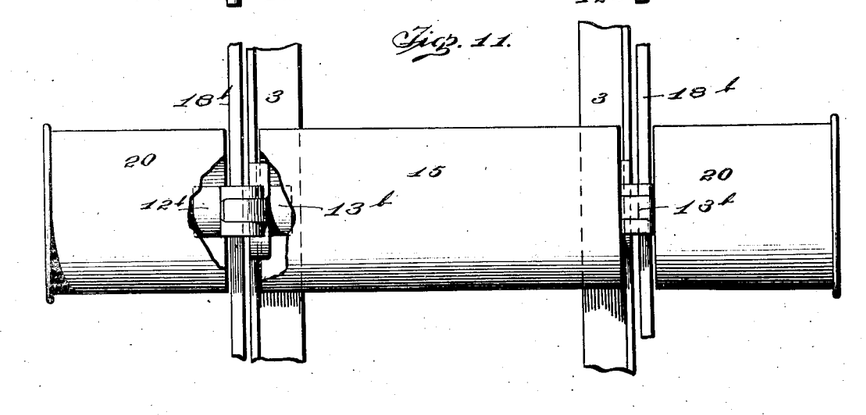
Figure 13:
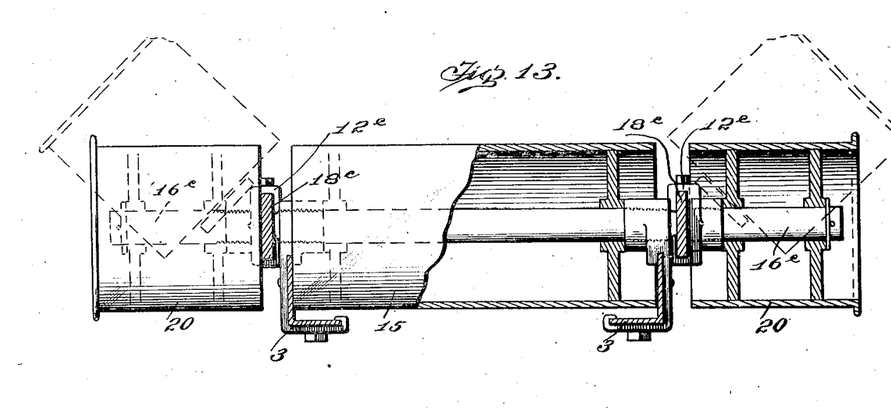
Figs. 13, 14, and 15 represent similar views, respectively, of another modification.
Figures 14, 19, 20:
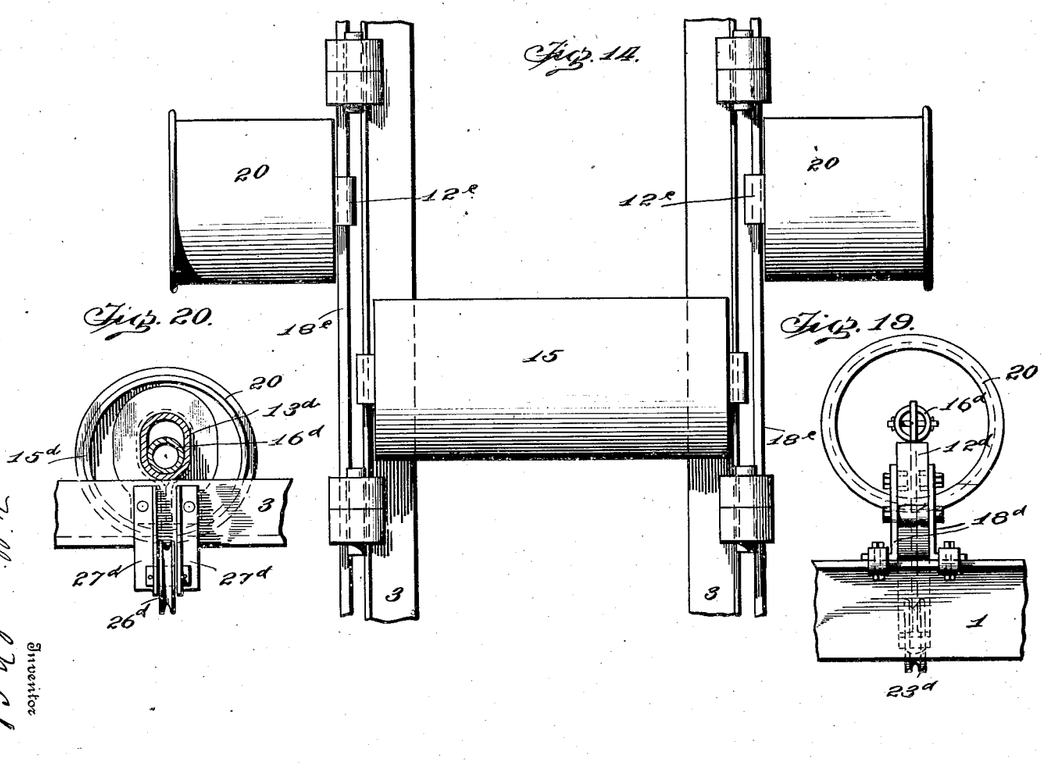
Figs. 17, 18, and 19 represent similar views to Figs. 1, 2, and 3, respectively, of a further modification.
Fig. 20 represents a detail sectional view taken on the plane of line 20 20 of Fig. 17.
Figure 15:
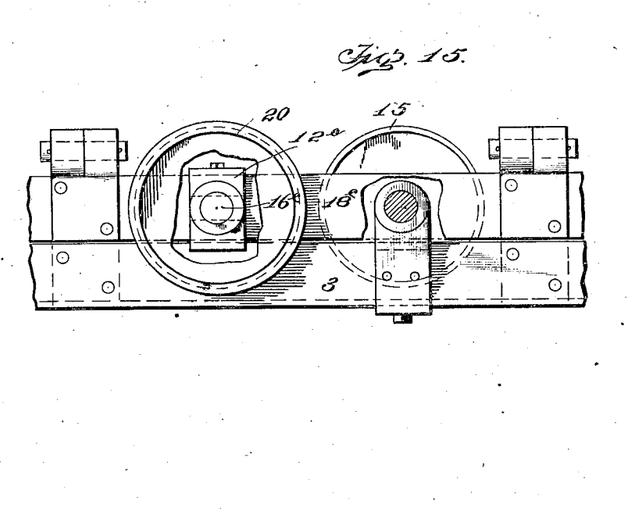
Figure 16:
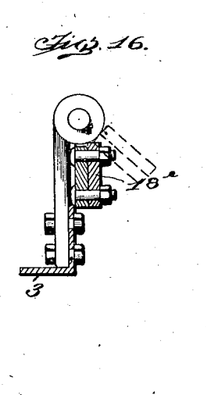
Fig. 16 represents enlarged detail views of the hinge connections between the longitudinally-connecting shafts and the auxiliary frame.
Figure 17:
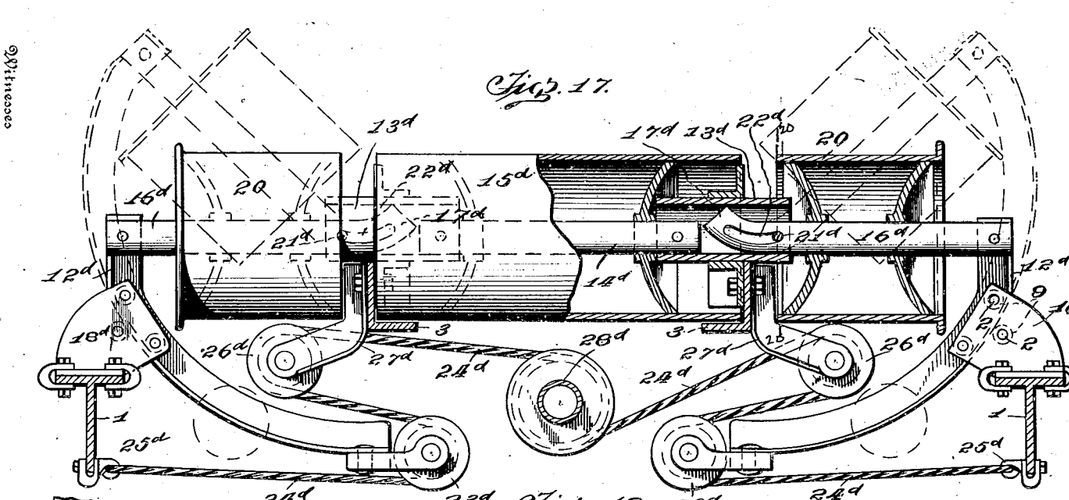
Figure 18:
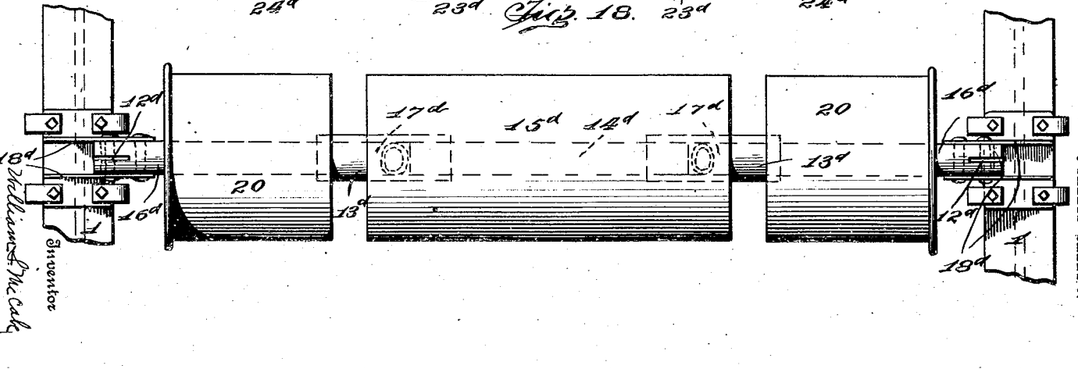

In the structure shown in Figs. 10, 11, and 12 the auxiliary frame is preferably held rigid and carries brackets, as $13^b$, carrying shaft $14^b$, designed to support a central belt-supporting pulley. To each bracket $13^a$ is pivoted an arm, as $12^b$, carrying a laterally-extending shaft, as $16^b$, each designed to be provided with a belt-supporting pulley. Each arm $12^b$ is provided with a suitable eye, through which is passed a longitudinal connecting-shaft, as $18^b$, whereby all of the arms $12^b$ of one side of the conveyer are connected, and movement of one will move the others. Now in order to position shafts $16^b$ in diagonal planes it is only necessary to grasp one of arms $12^b$ on each side of the conveyer, swing the same outwardly to the desired extent, and place a block between each of said arms and its respective bracket $13^b$, as indicated in dotted lines in Fig. 10.

The operation of the device disclosed in Figs. 13, 14, 15, and 16 is exactly similar to that last above described, the structure differing only in that longitudinally-connecting shafts, as $18^c$, are employed which are hinged directly to the auxiliary frame, the central pulleys being arranged as above described, but the lateral pulleys being carried upon shafts, as $16^c$, secured to brackets, as $12^c$, which in turn are clamped or otherwise suitably secured to shafts $18^c$. In this particular embodiment of the present invention it is my design to arrange the shafts $16^c$ intermediate the central pulleys, as will clearly appear by reference to Fig. 14; but it will of course be understood that said shafts $16^c$ may be arranged at any desired points along shafts $18^c$, as may be preferred, without departing in the least from the scope of the invention.

The embodiment disclosed in Figs. 17, 18, 19, and 20 employs a fixedly-supported auxiliary frame, with central pulleys, as $15^d$, similar to pulleys 15, carried by suitable axles $14^d$, each extending into a cuff, as $13^d$, at each end. Each cuff $13^d$ is provided with a lug, as $21^d$, and a shaft, as $16^d$, having its inner end bent, as at $17^d$, engages each of said lugs by means of a longitudinal curved slot, as $22^d$, the outer ends of shafts $16^d$ being secured to the upper ends of arc-shaped arms, as $12^d$, each of said arms slidably engaging a bracket, as $18^d$, attached to the main frame. The lower end of each arm $12^d$ is provided with a suitable pulley, as $23^d$, and a cable, as $24^d$, having one end attached to the main frame, as at $25^d$, is passed about the same and about a second pulley, as $26^d$, carried by a bracket, as $27^d$, secured to its respective side of the auxiliary frame, said cable being thence passed to and has its end secured about a centrally-arranged longitudinal shaft, as $28^d$, the cables $24^d$ being passed about said shaft $28^d$ from opposite sides, so that rotation of said shaft in one direction will take up both cables and rotation thereof in the opposite direction will pay out both cables. The shafts $16^d$ of course carry suitable pulleys, which are designed to be adjusted to the desired angle by rotation of shaft $28^d$, such rotation imparting longitudinal movement to arms $12^d$, the slotted engagement of shafts $16^d$ with lugs $21^d$ permitting such movement, as will clearly appear from the dotted position of the parts in Fig. 17.

Figure 21:
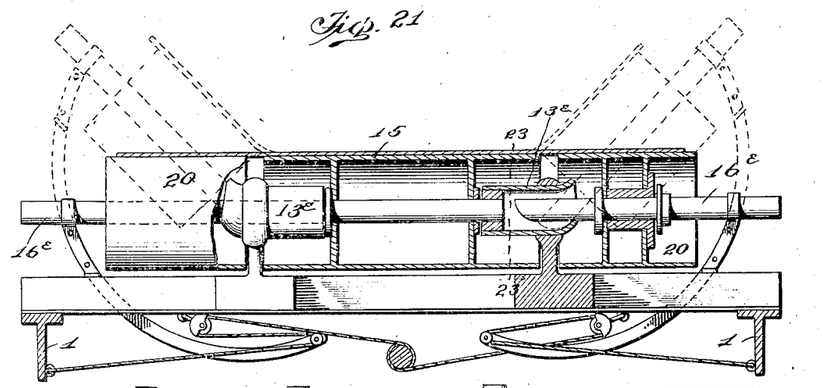
Figs. 21 and 22 represent similar views to Figs. 1 and 2, respectively, of a still further modification.
Figures 22, 23:
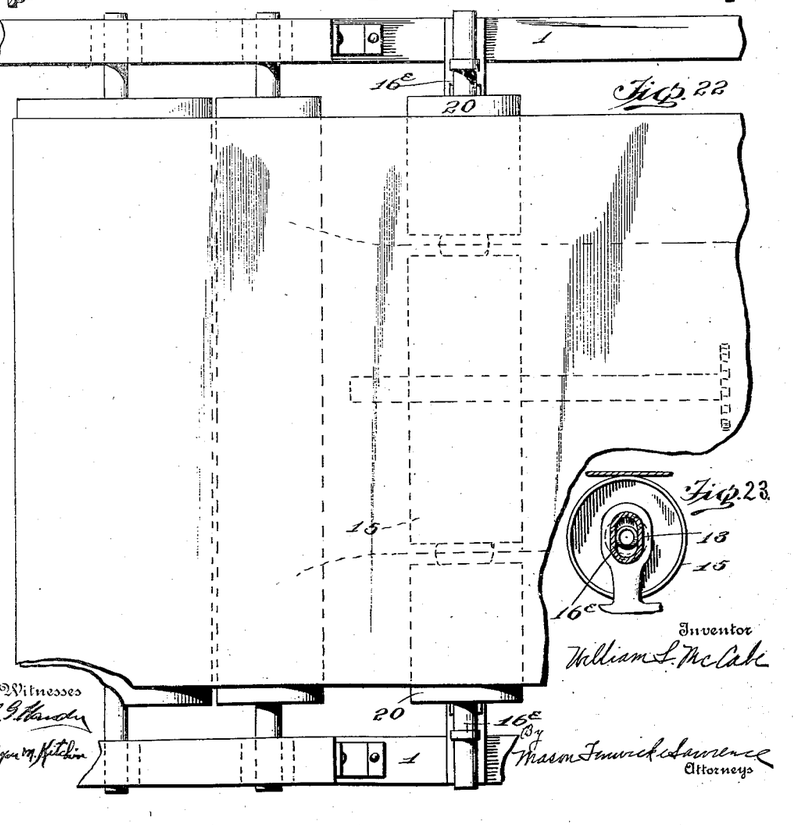
Fig. 23 represents a detail section on the plane of line 23 23 of Fig. 21.

The structure disclosed in Figs. 21, 22, and 23 is precisely the same as that last above mentioned, with the exception that cuffs, as $13^e$, are employed, which are not provided with lugs, but are bent upwardly at their outer ends, and the shafts, as $16^e$, corresponding to shafts $16^d$, are not slotted longitudinally and are beveled on their inner ends instead of being bent. The other parts are the same with slight alterations in the form of framework not material to the structure or operation of the present invention.

Having thus fully described my invention, what I claim as new, and desire to secure by Letters Patent, is—

1. In a mechanism of the class described, the combination of a main and an auxiliary frame, tilting belt-supports carried thereby, and means for moving one of said frames relative to the other for adjusting said supports.

2. In a mechanism of the class described, the combination with a suitable frame, of belt-supporting pulleys arranged therein, some of said pulleys being pivotally supported, and means for moving some of said pulleys for adjusting the pivoted pulleys to diagonal planes, substantially as described.

3. In a mechanism of the class described, the combination with a suitable frame, of belt-supporting pulleys arranged therein, means for altering the horizontal plane of said belt-supporting pulleys, and belt-supporting pulleys pivotally attached to said first-mentioned pulleys, substantially as described.

4. In a mechanism of the class described, the combination with a suitable frame, of belt-supporting pulleys mounted therein, means for altering the horizontal plane of said belt-supporting pulleys, and a pulley pivotally attached at each end of each of said belt-supporting pulleys, substantially as described.

5. In a mechanism of the class described, the combination with a suitable frame, of belt-supporting pulleys mounted therein, means for altering the horizontal plane of said pulleys, pulleys pivotally connected with said belt-supporting pulleys, and means pivotally connecting said last-mentioned pulleys to said frame, substantially as described.

6. In a mechanism of the class described, the combination with a suitable main frame, of an auxiliary frame therein, belt-supporting pulleys mounted in said auxiliary frame, means for altering the horizontal plane of said auxiliary frame, and pulleys connected to said belt-supporting pulleys, and also pivotally connected to said main frame, substantially as described.

7. In a mechanism of the class described, the combination with a suitable main frame, of an auxiliary frame arranged longitudinally of and movable laterally within said main frame, belt-supporting pulleys mounted on said auxiliary frame, and pulleys pivotally attached to said main frame, and having their inner ends movable with the auxiliary frame, substantially as described.

8. In a portable conveyer, the combination with a suitable main frame, of an auxiliary frame movable therein, and pulleys attached to said main frame and having their inner ends pivoted to the auxiliary frame, substantially as described.

9. In a portable conveyer, the combination with a suitable main frame, of an auxiliary frame movably mounted therein, belt-supporting pulleys carried by said auxiliary frame, cuffs carried by said auxiliary frame, pulley-carrying shafts slidably engaging said cuffs, and means pivotally supporting the free ends of said shafts, substantially as described.

10. In a portable conveyer, the combination with a suitable frame of cuffs carried thereby, pulley-carrying shafts slidably engaging said cuffs, means pivotally supporting the free ends of said cuffs, and means for moving said cuffs for adjusting said shafts to diagonal planes, substantially as described.

11. In a portable conveyer, the combination with a main frame, of an auxiliary frame movably mounted therein, means for moving said auxiliary frame, cuffs carried by said auxiliary frame, pulley-carrying shafts having bent ends extending into and slidably engaging said cuffs, and means pivotally supporting the free ends of said shafts, substantially as described.

12. In a portable conveyer, the combination with a main frame, of an auxiliary frame movable therein, pulley-carrying shafts slidably engaging either side of said auxiliary frame, and brackets carried by either side of said main frame and pivotally engaging the free ends of their respective shafts, substantially as described.

13. In a portable conveyer, the combination with a suitable frame of cuffs carried thereby, pulley-carrying shafts slidably engaging said cuffs, means pivotally supporting the free ends of said cuffs, and means for simultaneously moving said cuffs for adjusting said shafts to diagonal planes, substantially as described.

14. In a mechanism of the class described, the combination of a main frame and an auxiliary frame, belt-supports carried thereby, and means for adjusting said auxiliary frame for tilting said supports.

15. In a mechanism of the class described, the combination with a main frame, of an adjustable auxiliary frame within the same, and tilting belt-supports carried by said frame.

16. In a conveyer, the combination with a framework, of belt-supporting pulleys pivotally mounted thereon, cams supporting said pulleys, and means for moving said cams for moving the pulleys in various planes relative to each other, substantially as described.

17. In a mechanism of the class described, the combination with a framework, of belt-supporting pulleys pivotally mounted thereon, and cams positioned beneath said pulleys and supporting some of the same for adjusting the pulleys to various planes, substantially as described.

18. In a mechanism of the class described, the combination with a framework, of belt-cupping means carried thereby, and a cam engaging said means for operating the same, substantially as described.

19. In a conveyer, the combination with a framework, of belt-cupping pulleys pivotally mounted thereon, and a cam for shifting said pulleys to various planes, substantially as described.

20. In a mechanism of the class described, the combination with a framework, of a belt-cupping pulley mounted thereon, and a cam engaging the support of said pulley, substantially as described.

21. In a conveyer, the combination with a framework, of belt-cupping means mounted thereon, a pair of cams supporting said belt-cupping means, and means for effecting synchronous action of said cams for moving said belt-cupping means, substantially as described.

22. In a mechanism of the class described, the combination of a main and an auxiliary frame, tilting belt-supports carried thereby, and means for adjusting said frames relative to each other for simultaneously moving said supports.

23. In a mechanism of the class described, the combination with a main frame, of a vertically-adjustable auxiliary frame carried thereby, and movably-mounted belt-supports connecting said frames.

24. In a mechanism of the class described, the combination of a plurality of frames movable relative to each other, and movably-mounted belt-supports connecting said frames.

In testimony whereof I hereunto affix my signature in presence of two witnesses.

WILLIAM L. McCABE.

Witnesses:
JOHN L. FLETCHER,
EDGAR M. KITCHIN.